Sept. 9, 1969  H. F. EVERETT  3,466,148
BLOOD OXYGENATOR
Filed Feb. 15, 1966  3 Sheets-Sheet 1
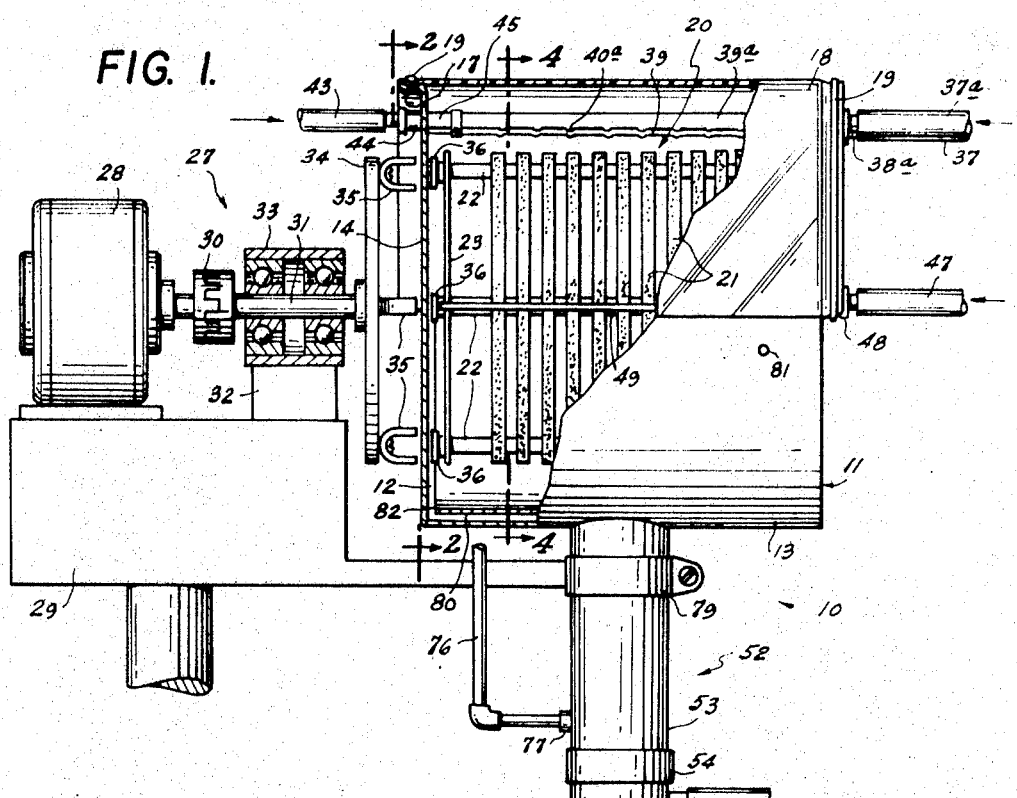
FIG. 1.
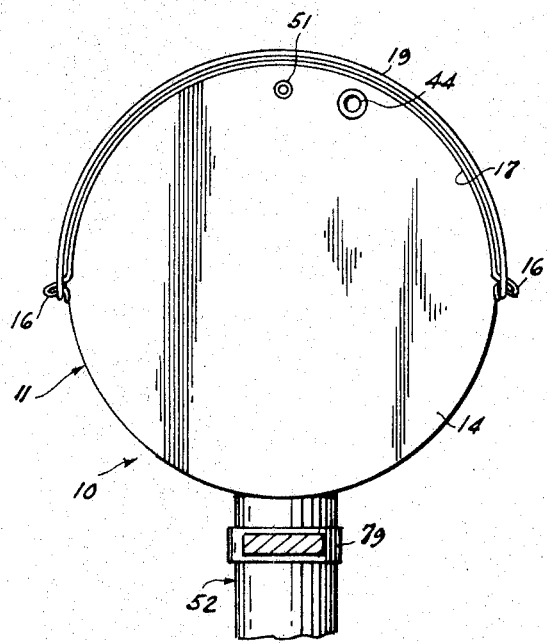
FIG. 2.
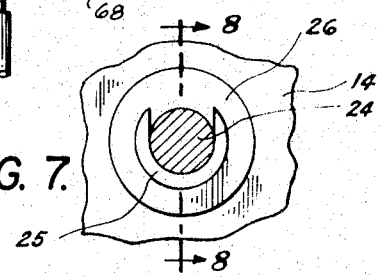
FIG. 7.
FIG. 8.
INVENTOR.
HAZEN F. EVERETT
BY
*Alan Sutherland*
ATTORNEY

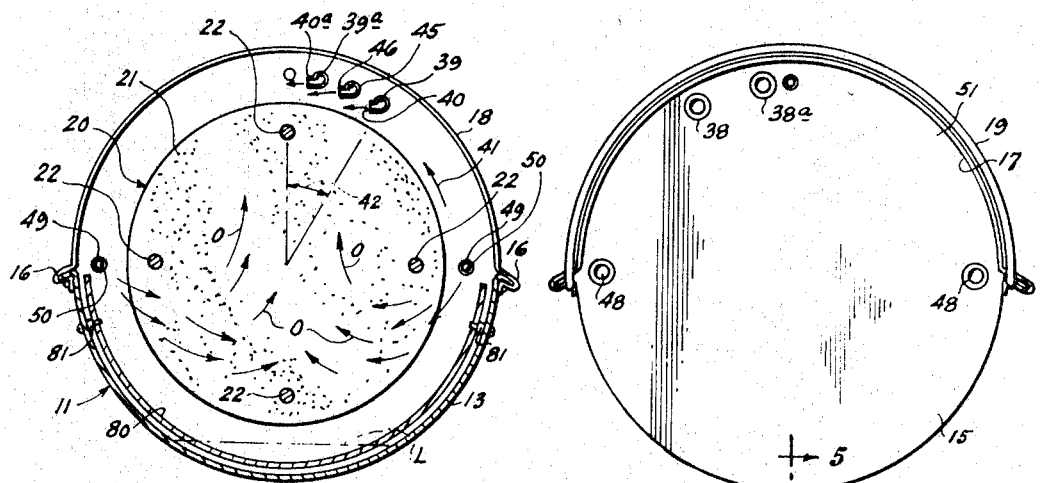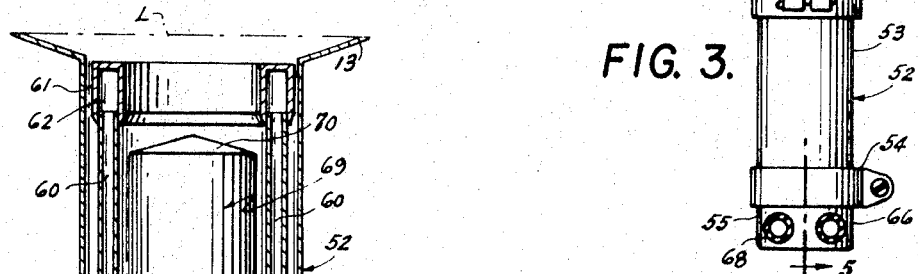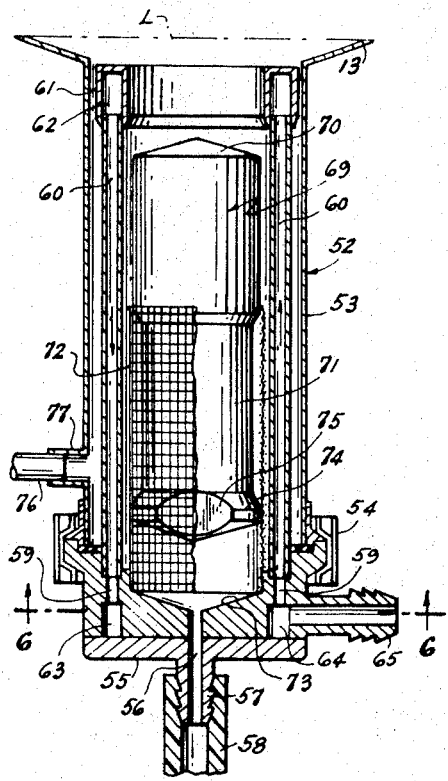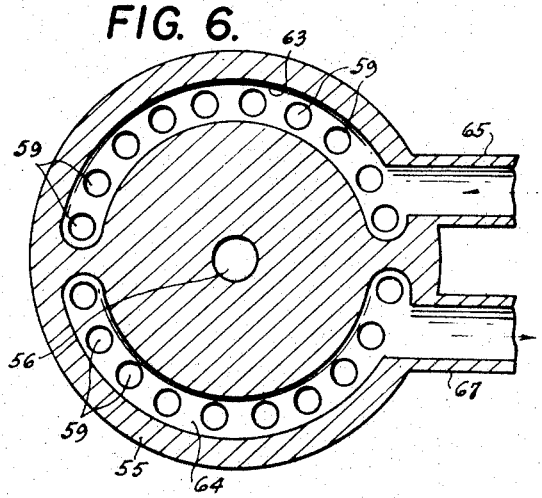
FIG. 4.
FIG. 3.
FIG. 5.
FIG. 6.
INVENTOR.
HAZEN F. EVERETT
BY
ATTORNEY

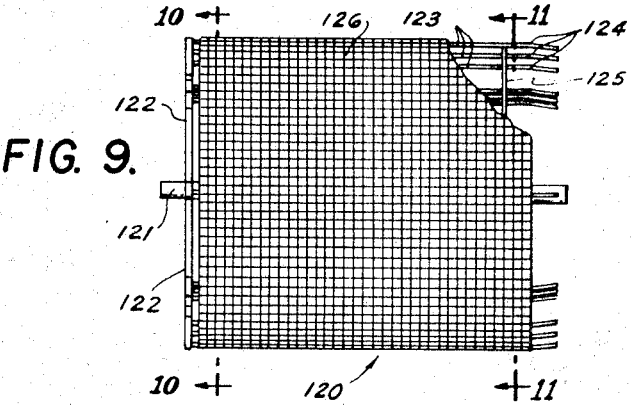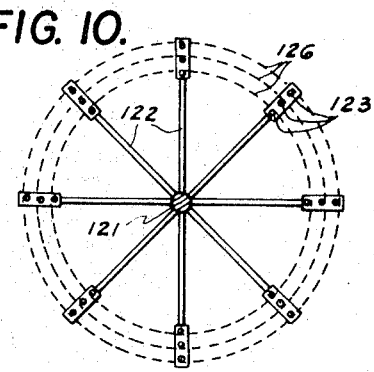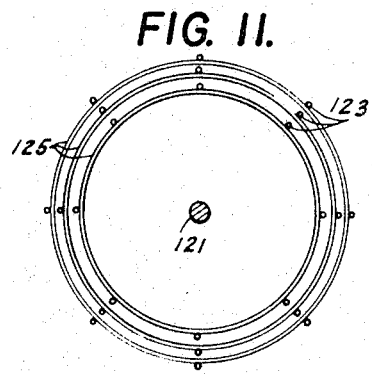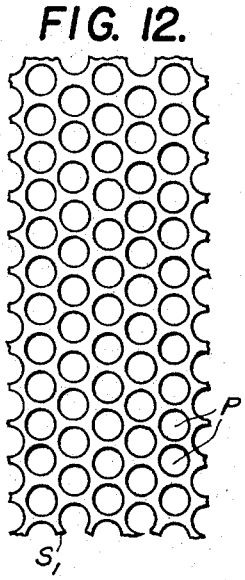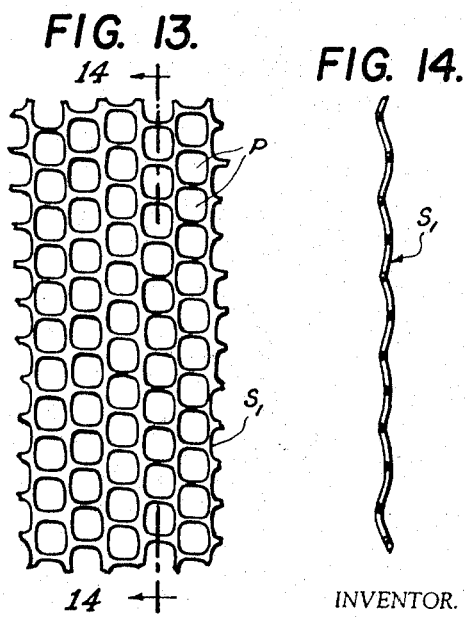

United States Patent Office 3,466,148
Patented Sept. 9, 1969

3,466,148
BLOOD OXYGENATOR
Hazen F. Everett, 120 Bedford Road,
Hillsdale, N.J. 07642
Continuation-in-part of application Ser. No. 415,375,
Dec. 2, 1964. This application Feb. 15, 1966, Ser.
No. 527,607
Int. Cl. B01f 1/00
U.S. Cl. 23—258.5                                          17 Claims

ABSTRACT OF THE DISCLOSURE

In a blood oxygenator, at least one dispersing element mounted on an open support is rotated in a chamber and has a three-dimensional, reticulate open cell structure, for example, as constituted by one or more perforate plastic sheets having the material between perforations displaced out of the normal flat plane, or as constituted by an open cellular plastic foam, venous blood is directed onto the top of the dispersing element for dispersion through the latter during its rotation, oxygen is admitted to the chamber for oxygenating the thus dispersed blood, carbon dioxide and excess oxygen are vented from the chamber, and oxygenated blood dripping from the bottom of the dispersing element is discharged through an outlet extending from the chamber bottom.

---

This invention relates generally to blood oxygenators, that is, apparatus for oxygenating blood, for example, during cardio-pulmonary bypass. This application is a continuation-in-part of my copending application for U.S. Letters Patent, Ser. No. 415,375, filed Dec. 2, 1964.

The existing blood oxygenators have many disadvantages. For example, disc oxygenators have a high priming volume, are composed of many parts and are expensive. Bubble oxygenators effect the turbulent frothing of bubbles through the blood, and hence require anti-foam agents and have only a limited safe operating time. Blood oxygenators of the sheet and screen type are large in size and have expensive, complicated structures, and further require recirculation or repeated passage of the blood through the oxygenator in order to complete the desired exchange of oxygen and carbon dioxide.

Accordingly, it is an object of this invention to provide a blood oxygenator that will permit long, safe cardio-pulmonary bypass, and yet require a minimum priming volume of blood.

Another object is to provide a blood oxygenator which is far less complicated and less costly than previously available blood oxygenators.

A further object is to provide a blood oxygenator which is small and compact, does not require the use of anti-foam agents, and quickly effects the required exchange of oxygen and carbon dioxide without recirculation of the blood through the oxygenator and with minimum trauma to the blood.

In accordance with this invention, the venous blood is dispersed through an element disposed in an oxygen-rich atmosphere and constituted by a reticulate structure, preferably of plastic so as to be readily and economically disposable after use. The myriad, preferably three-dimensional arrangement of open cells or pores throughout the reticulate structure constituting the dispersing element provides a countless number of filming areas over which the volumes of blood entering the element are instantly and gently divided to cause the required exchange of oxygen and carbon dioxide to be accomplished quickly and with minimum trauma to the blood.

In a preferred embodiment of the invention, at least one dispersing element having a circular periphery and consisting of an open cellular or reticulate structure is rotated within a chamber about a substantially horizontal axis concentric with the circular periphery of the dispersing element, inlet means for venous blood from a patient opens within the chamber toward the periphery of the dispersing element adjacent the top of the latter for dispersion of the venous blood through the open reticulate structure of the element during rotation of the latter, oxygen is admitted into the chamber so as to oxygenate the venous blood dispersed within the element, vent means releases carbon dioxide and excess oxygen from within the chamber, and the oxygenated blood is returned to the patient through an outlet extending from the bottom of the chamber.

In accordance with a further feature of this invention, a sump depends from the bottom of the chamber rotatably receiving the dispersing element or elements to contain a reservoir of oxygenated blood above the outlet, and heat exchange means and filtering means are disposed in the sump and respectively operate to maintain the desired temperature of, and remove bubbles and solid particles from the oxygenated blood returned to the patient through the outlet.

The above, and other objects, features and advantages of the invention, will be apparent in the following detailed description of an illustrative embodiment thereof which is to be read in connection with the accompanying drawings forming a part hereof, and wherein:

FIG. 1 is a side elevational view of a blood oxygenator embodying this invention, and which is shown partly broken away;

FIG. 2 is a sectional view taken along the line 2—2 on FIG. 1;

FIG. 3 is an elevational view showing the end of the housing of the blood oxygenator opposed to that appearing on FIG. 2;

FIG. 4 is a sectional view taken along the line 4—4 on FIG. 1;

FIG. 5 is an enlarged sectional view taken along the line 5—5 on FIG. 3;

FIG. 6 is a detail sectional view taken along the line 6—6 on FIG. 5, but on an enlarged scale;

FIG. 7 is an enlarged detail view illustrating means by which an assembly of dispersing elements is rotatably mounted within the housing of the blood oxygenator;

FIG. 8 is a sectional view taken along the line 8—8 on FIG. 7;

FIG. 9 is a side elevational view, partly broken away, of the dispersing element assembly of a blood oxygenator in accordance with another embodiment of this invention;

FIG. 10 is a sectional view taken along the line 10—10 on FIG. 9;

FIG. 11 is a sectional view taken along the line 11—11 on FIG. 9, but with the dispersing sleeves removed from the support structure therefor;

FIG. 12 is a fragmentary view of a preforated sheet of plastic material from which a dispersing element can be formed;

FIG. 13 is a view similar to that of FIG. 12, but showing the sheet after heat treatment thereof; and FIG. 14 is a sectional view taken along the line 14—14 on FIG. 13.

Referring to the drawings in detail, and initially to FIG. 1 thereof, it will be seen that a blood oxygenator embodying this invention and there generally identified by the reference numeral 10 includes a housing 11 defining a chamber 12 which is generally cylindrical and has its axis extending horizontally. The housing 11 may include a lower wall portion 13 of upwardly concave, semi-cylindrical form, and circular end walls 14 (FIGS. 1 and 2) and 15 (FIG. 3) which are welded or otherwise joined, along the lower halves of their circumferences, to the end edges of wall portion 13. Downwardly and outwardly inclined flanges 16 extend along the longitudinal upper edges of wall portion 13. Flanges 17 extend along the upper halves of the circumferences of end walls 14 and 15 and are directed axially outward from the latter. The flanges 17 are preferably formed with grooves or indentations extending circumferentially therealong.

The wall portion 13 and end walls 14 and 15 of housing 11 are preferably formed of a non-magnetic stainless steel, and may have their inner surfaces coated with a silicone resin. The housing 11 further has a removable cover 18 formed of a sheet or film of suitably, preferably transparent plastic, for example, polyethylene tetraphthalate resin which is commercially available under the trademark Mylar. The plastic cover 18 is merely wrapped over the upper portion of the housing and is dimensioned so that the opposite end edges of the cover 18 rest on the flanges 17 while the side edges of the cover extend sufficiently to permit the same to be folded under the side flanges 16. The cover 18 is held in place by a continuous elastic band 19 engaging over the end edge portions of the cover resting on flanges 17 (FIGS. 1, 2 and 3) where the bank 19 is guided by the circumferential indentations of flanges 17, and further engaging under the folded side edges of cover 18 at the undersides of flanges 16 (FIGS. 2, 3 and 4).

Removably disposed in housing 11 is an assembly 20 of one or more dispersing elements 21. Each element 21 has a circular periphery and is mounted for rotation about the horizontal axis of the housing 11 with the center of each circular dispersing element 21 being concentric with the axis of rotation. In accordance with the present invention, each dispersing element 21 is constituted by a reticulate or open cellular structure having a myriad, preferably three-dimensional arrangement of open cells or pores communicating with each other throughout the structure. It has been found that, for blood oxygenating purposes, a dispersing element having from 3 to 20, and preferably 10, pores per linear inch in all directions is most desirable.

The three-dimensional reticulate or open cellular structure of each dispersing element 21 may be formed in various ways. For example, each element 21 may be constituted by one or more sheets of suitably inert plastic material, such as, polypropylene, polyethylene tetraphthalate, polyvinylchloride, nylon, polytetrafluoroethylene and the like, with each plastic sheet being perforated or cut and expanded to provide openings therethrough and with the material between such openings being displaced permanently out of the original plane of the sheet to form the three-dimensional network.

A preferred procedure for forming each reticulate sheet of dispersing element 21 consists in stamping a sheet $S_1$ (FIG. 12) of polypropylene or other plastic with a regular arrangement of circular perforations P and then heating the stamped sheet to the temperature at which the plastic material thereof flows. Such heating causes the plastic between the perforations to elongate and thereby impart generally rectangular configurations to the perforations, as shown on FIG. 13. Further, the heating of the plastic causes polishing of the surface thereof, and thus removes all sharp edges or burrs around the stamped perforations. During the described heating of the plastic sheet $S_1$, the latter may be supported on a suitably irregular surface so that the softened plastic will conform to that irregular surface and thereby displace the material between the openings or perforations out of the original flat plane of the sheet $S_1$, as shown on FIG. 14.

Non-reactive sheet metals, such as stainless steels, may be used in place of the plastic sheet materials for production of the dispersing elements, and the reticulate or open cellular structures formed of non-reactive metals are preferably coated with silicone resin. However, the dispersing elements formed of plastics, as described above, are preferred over those formed of non-reactive metals in that the initial costs are sufficiently low to permit disposal of the plastic dispersing elements after use.

The three-dimensional reticulate or open cellular structures of dispersing elements 21 may also be formed of layers of a netted or woven fabric of monofilament plastics, for example, the plastics indicated above. In such a structure, the interstices between the adjacent layers may be defined by the undulating configuration of the individual monofilaments which are netted or woven to form the fabric, or by providing a supporting structure which establishes suitable spacing between adjacent layers. The several layers of woven or netted fabric may be arranged in an axial series to provide the necessary axial thickness of each dispersing element, or superposed radially.

The three-dimensional reticulate or open cellular structures of dispersing elements 21 may also be constituted by a void plastic foam, for example, a void polyurethane foam of the type available commercially from the Foam Division, Scott Paper Company, Chester, Pa., and which has a myriad three-dimensional arrangement of open cells or pores communicating with each other throughout the foam structure.

In the embodiment of the invention illustrated on FIGS. 1 and 4, the dispersing elements 21 are in the form of discs of substantially overall thickness, for example, ⅜ inch, and are removably mounted in axially spaced, aligned relationship on four rods 22 (FIGS. 1 and 4) which extend through equally spaced apart holes formed in the several dispersing elements adjacent the peripheries of the latter. The ends of the rods 22 are removably joined to rigid, circular end plates 23 so that the rods 22 and end plates 23 form a carrying frame for the dispersing elements 21.

The assembly 20 is rotatably mounted within housing 11 by means of trunnions 24 (FIGS. 7 and 8) projecting axially at the centers of the outer surfaces of end plates 23 and being received in sockets 25 which are welded or otherwise secured at the centers of end walls 14 and 15 of the housing. Each socket 25 preferably opens upwardly, as at 26, as well as axially so that the trunnions 24 can be displaced upwardly out of the sockets 25 during removal of assembly 20 from housing 11.

Rotation of assembly 20 within housing 11 is effected by a drive assembly 27 (FIG. 1) which may be disposed wholly outside of housing 11, as shown. The drive assembly 27 may include an electric motor 28 mounted on a support 29 and connected through a coupling 30 with a shaft 31 journalled in bearings 32 mounted in a bearing block 33 also carried by support 29. The housing 11 is also mounted on the support 29, as hereinafter described in detail, so that the axis of rotation of assembly 20 in the housing is aligned with the axis of shaft 31. The end of shaft 31 directed toward housing 11 carries a disc 34 to which magnets 35 are secured in spaced positions corresponding to the spacing between rods 22 of assembly 20. During operation of motor 28, magnets 35 move along a circular path located at the outside of housing end wall 14 and having a radius substantially equal to the radial spacing of rods 22 from the axis of rotation of assembly 20. The ends of rods 22 adjacent housing end wall 14 carry magnetic members or discs 36, for example, formed of a magnetic stainless steel, so that, when magnets 35 register with members 36 at the opposite side of the non-magnetic end wall 14, paths for the magnetic flux of the magnets are established through the members 36 and form a magnetic coupling between the rotated disc 34 and the assembly 20. Since there is no direct mechanical connection between illustrated drive 27 and assembly 20 there is no need to provide an opening in the wall 14 of housing 11 for a mechanical connection and sterilization of those components of the oxygenator 10 which come in contact with the blood is greatly facilitated. However, assembly 20 may be driven directly from a drive motor mounted outside housing 11 through a mechanical coupling (not shown) extending from the motor shaft through a suitably sealed opening in wall 14 and being connected to disc 34.

Venous blood to be oxygenated is brought from the patient to the oxygenator 10 by way of at least one flexible tube 37 (FIG. 1) connected to a related hose fitting 38 (FIGS. 1 and 3) which extends through, and is suitably secured in housing end wall 15 adjacent the top of the latter. A tubular manifold 39 extends from the inner end of each hose fitting 38 and is directed parallel to the axis of rotation of assembly 20. The manifold 39 is disposed near the peripheries of dispersing elements 21 adjacent the tops of the latter and is formed with nozzles 40 spaced apart along the manifold so as to lie substantially in the vertical planes of rotation of the several dispersing elements 21. Nozzles 40 may extend horizontally from the bottom of manifold 39 and open in the direction of movement of the top portions of elements 21. Thus, venous blood delivered to the manifold 39 through tube 37 is divided and falls downwardly, under the influence of gravity, from nozzles 40 onto the peripheries of dispersing elements 21. As shown particularly on FIG. 4, the manifold 39 having horizontally opening nozzles may be spaced angularly, in the direction opposed to the rotation of the dispersing elements indicated by the arrow 41, from the vertical plane extending upwardly from the axis of rotation of assembly 20 by an angle 42 which is preferably in the range between approximately 20 and 30 degrees.

The described angular spacing of manifold 39 from the vertical plane extending upwardly from the axis of rotation of assembly 20, causes blood issuing horizontally from the nozzles and showering on the peripheries of the dispersing elements from nozzles 40 to enter the reticulate structure of the dispersing elements adjacent the upper portions thereof. By reason of the myriad, preferably three-dimensional arrangement of open cells or pores provided throughout each dispersing element 21, there are provided within the dispersing element a countless number of filming areas over which the volumes of blood entering the element are instantly and gently divided.

Venous blood to be oxygenated may also be brought from the patient by way of a second flexible tube 37a (FIG. 1) connected to a hose fitting 38a (FIGS. 1 and 3) in end wall 15. A tubular manifold 39a (FIG. 4) similar to the previously described manifold 39 extends parallel to the latter from fitting 38 and has nozzles 40a from which the returned blood is showered onto the elements 21. The tube 37 may carry superior return while the tube 37a carries inferior return.

Alternatively, the manifolds 39 and 39a may be disposed at opposite sides of the vertical plane extending upwardly from the axis of assembly 20 and have their nozzles 40 and 40a directed downwardly toward the exact top of elements 21, in which case, the correct selection of the rotational speed of assembly 20 best ensures against the frothing of the venous blood upon impingement against the peripheries of elements 21.

Transfusion blood and blood from the return reservoir of a suction apparatus, for example, of the type disclosed in my application for United States Letters Patent Ser. No. 192,519, filed May 4, 1962, now United States Patent No. 3,191,600, may also be delivered to the oxygenator 10 by way of a flexible tube 43 (FIG. 1) connected to a hose fitting 44 (FIGS. 1 and 2) which extends through, and is secured in housing end wall 14 adjacent the top of the latter. A manifold 45 (FIGS. 1 and 4) extends from the inner end of fitting 44 between the manifolds 39 and 39a and is similarly provided with spaced apart nozzles 46 directed substantially horizontally above the peripheries of dispersing elements 21. As shown particularly on FIG. 4, manifold 45 is also disposed so that blood issuing from nozzles 46 showers onto the peripheries of the dispersing elements adjacent the tops of the latter. The use of separate manifolds 39 and 39a and manifold 45 for admitting venous blood and transfusion blood or blood from a suction apparatus into housing 11, ensures that the feeding of venous blood from the patient by gravity siphon will not be interrupted.

Oxygen is supplied to the interior space or chamber 12 in housing 11 by way of flexible tubes 47 (FIG. 1) connected to hose fittings 48 which extend through, and are secured in end wall 15 adjacent the opposite sides of the latter (FIG. 3). Extending from the inner ends of fittings 48 are rigid tubes 49 (FIGS. 1 and 4) each having a row of perforations 50 spaced apart therealong. The perforated tubes 49 extend along the opposite sides of the assembly 20 of dispersing elements 21 and both lie substantially in a horizontal plane passing through the axis of rotation of assembly 20. As shown particularly in FIG. 4, the tubes 49 are angularly disposed so that the perforations 50 thereof are directed downwardly and inwardly toward assembly 20 at angles of approximately 45 degrees from the horizontal. Thus, oxygen issuing from the perforations 50 of tubes 49, as indicated by the arrows O on FIG. 4, is dispersed or swept continuously through, and between dispersing elements 21 over the entire areas of the latter for quickly accomplishing the required exchange of oxygen and carbon dioxide with respect to the blood divided over the filming areas of the dispersing elements. Vent openings 51 (FIGS. 2 and 3) are provided in end walls 14 and 15 near the top thereof to permit the escape of carbon dioxide and excess oxygen from within housing 11.

Due to the thorough dispersion of the blood through elements 21 and the effective dispersion of the oxygen, oxygenation of the blood is completed when the blood drains from dispersing elements 21 at the bottoms of the latter.

In order to provide a small volume reservoir of oxygenated blood, housing 11 has a sump 52 depending centrally from the bottom thereof. The sump 52 is defined by a vertical, cylindrical wall 53 of very substantially smaller diameter than housing 11 and having its upper end edge welded to the bottom of housing wall 13 around an opening in the latter. Removably secured to the lower end of cylindrical wall 53, as by a clamp 54, is a circular bottom member or closure 55. Member 55 has a central, vertical bore 56 (FIG. 5) which communicates with a hose fitting 57 constituting the outlet for oxygenated blood to be returned to the patient through a flexible tube 58. A circular arrangement of spaced apart bores 59 are formed in the top portion of member 55 and receive the lower ends of vertically extending heat transfer tubes 60. The heat transfer tubes 60 extend upwardly from member 55 through the interior space defined by cylindrical wall 53 and are disposed adjacent the latter. The upper ends of heat transfer tubes 60 are secured in corresponding openings in the bottom of an annular header 61 which is further formed with an annular cavity 62 through which the upper ends of all of the tubes 60 are placed in communication with each other. The bottom member or closure 55 of sump 52 further has arcuate cavities 63 and 64 each extending around approximately one-half of member 55 and communicating with a corresponding half of the bores 59, as shown in FIG. 6. An inlet hose fitting 65 is formed on bottom member 55 for connection of a supply hose 66 and communicates with the cavity 63, and an outlet hose fitting 67 communicates with arcuate cavity 64 and is connected with a return or discharge hose 68. Thus, when hot or cold water or other heat transfer medium, is supplied through hose 66 and discharged through hose 68, the water flows upwardly through half of the heat transfer tubes 60 in sump 52 and then flows downwardly from header 61 through the other half of the heat transfer tubes 60.

Disposed within the circular arrangement of heat transfer tubes 60 is a flow core 69 having a shallow, conical upper end 70 disposed at a level below the header 61 so that, after the oxygenated blood has passed downwardly through the central opening of the annular header, the blood is directed radially outward by the top 70 of flow core 69 to flow around and between the tubes 60 and thereby be heated or cooled through heat exchange or transfer with the hot or cold water flowing through such tubes. The lower end portion 71 of flow core 69 is of reduced diameter and extends axially within a cylindrical screen 72. The upper end edge of screen 72 supports the flow core 69, while the lower end of screen 72, which extends below the flow core, seats in a circular recess 73 formed in the top surface of bottom member 55 around bore 56. The bottom end of flow core 69 has a flange 74 resting against the inner surface of screen 72 to steady and axially locate the flow core 69, and such flange 74 is formed with flats 75 to permit the blood to flow between the flats 75 and the inside of the screen.

A sight tube 76 of glass or transparent plastic extends upwardly from a tube fitting 77 at the lower portion of sump 52 so that the level of blood in the sump will be indicated at the sight tube.

The housing 11 of oxygenator 10 can be mounted on support 29 by a clamp 79 extending from the latter and embracing the sump 52.

In order to ensure that oxygenated blood dripping from the lower portions of dispersing elements 21 will not directly enter sump 52, a semi-cylindrical shield 80 (FIGS. 1 and 4), preferably of stainless steel, is arranged within the lower wall portion 13 of housing 11. Shield 80 is uniformly spaced from wall portion 13, as by spacing support pins 81 (FIG. 4) received in suitably located holes in the shield, and the opposite end edges 82 (FIG. 1) of the shield are spaced axially from the adjacent end walls 14 and 15. Thus, oxygenated blood from dispersing elements 21 must flow over shield 80 toward the end walls 14 and 15 and then axially toward the center between shield 80 and wall portion 13 before reaching the opening to sump 52.

In operating the oxygenator 10, the rate of removal of oxygenated blood through the outlet tube 58 is controlled, preferably by a suitable level control device (not shown), so that a relatively small volume or reservoir of oxygenated blood is maintained in sump 52 up to the level L indicated on FIG. 5 which is below the dispersing elements 21 and approximately one inch above the bottom of housing 11. Since the dispersing elements do not run through the reservoir of oxygenated blood at the bottom of housing 11, such blood is not excessively agitated so as to cause frothing thereof. It will also be apparent that the surface area at the level L is substantially greater than the cross-sectional area of the opening from the housing 11 through the center of header 61 into sump 52, and this relationship of areas, along with the provision of the above described shield 80, serve to substantially avoid the entrainment of froth or bubbles from the housing 11 into the sump. Further, it will be seen that the oxygenated blood, after being warmed or cooled by contact with tubes 60 having heat exchange medium flowing therethrough, can enter the outlet bore 56 only by passing from the outside through the cylindrical screen 72, and the screen 72 functions both to filter the blood and to resist the carrying of bubbles or froth into the outlet bore 56. The downward spacing of the upper end 70 of flow core 69 from the header 61 avoids localized and drastic increases in the velocity of the blood flows which would have a tendency to carry along froth or bubbles.

The described oxygenator 10 embodying this invention is extremely compact, considering the rate at which oxygenation of the blood can be effected. For example, in an oxygenator having an assembly 20 of only six dispersing elements 21 each having a diameter of approximately six inches and being rotated at a speed of approximately fifteen revolutions per minute, one hundred percent saturation of the blood with oxygen has been achieved for flows up to two thousand cubic centimeters per minute.

Further, the oxygenator embodying this invention has a minimal priming volume in that it does not require a pool of blood for filmers to dip into or for oxygen to be bubbled through. Priming of the oxygenator only requires a volume of blood or fluid sufficient to fill the various tubes extending to and from the patient, to wet the dispersing elements 21 and to fill the small diameter sump 52 up to the level L.

The volume of blood required to prime the oxygenator may be further reduced by omitting the initial wetting of the dispersing elements. In that case, during priming, the tube 37 is disconnected from hose fitting 38 and either placed into housing 11 so as to discharge priming blood or fluid directly into the lower portion of the housing without contacting dispersing elements 21, or the housing 11 is provided with an additional hose fitting or inlet (not shown) intended to receive tube 37 during priming and opening into the housing at a location where priming blood or fluid entering therethrough will not contact the dispersing elements. After filling of the tubes extending to and from the patient and of the sump 52 up to the level L, the tube 37 is reconnected to hose fitting 38.

When the patient initially goes on by-pass, the rate of return of priming blood or fluid from the oxygenator to the patient by way of tube 58 is made slower than the rate at which venous blood is supplied to the oxygenator from the patient. Thus, the blood initially withdrawn from the patient serves to wet the dispersing elements 21 and, as such blood is oxygenated and mingles with the priming blood or fluid in sump 52, the return flow to the patient through tube 58 is gradually increased up to the desired rate. The described oxygenator may optionally be employed for initially "bleeding" the patient, that is, reducing the volume of blood in the patient during the operative procedures, and of employing the blood withdrawn from the patient for that purpose so as to initially wet the dispersing elements.

It should be noted that the use of the blood initially withdrawn from the patient for wetting of the dispersing elements 21 is possible only by reason of the fact that such wetting or priming of the dispersing elements only requires a relatively small volume of blood which is well within the volume that may be withdrawn from the patient, and the fact that oxygenation of the blood is completed when the blood drips from the lower portions of the dispersing elements into the reservoir of priming blood or fluid maintained up to the level L in housing 11.

Referring now to FIG. 9, it will be seen that an alternative construction for a dispersing element assembly 120, which may replace the previously described assembly 20 in housing 11, comprises a shaft 121 of sufficient length to be journalled, at its ends, in sockets 25 (FIGS. 7 and 8). Angularly spaced arms 122 (FIGS. 9 and 10) extend radially from shaft 121 adjacent one end of the latter, and the outer end of each arm 122 has one or more support rods 123 extending therefrom parallel to shaft 121. In the embodiment shown, each arm 122 has three radially spaced rods 123 extending therefrom. The free end portions of rods 123 are preferably curved inwardly, as at 124 (FIG. 9). In order to reinforce the assembly of rods 123, concentric rings 125 (FIGS. 9 and 10) extend between and connect the free end portions of the similarly disposed rods 123 extending from all of the arms 122.

When each arm 122 has three rods 123 extending therefrom, as shown, assembly 120 further comprises three dispersing elements 126 (FIGS. 9 and 10) in the form of concentric, generally cylindrical reticulated sleeves of suitably different diameters formed from perforated plastic material which has been treated, for example, as described above with reference to FIGS. 12, 13 and 14. Thus, each dispersing sleeve 126 is of three-dimensional reticulate structure in that the material between the perforations of the treated sheet material does not lie in the original flat plane of the latter before the formation of the sheet material into a sleeve or cylinder. Such three-dimensional reticulate structure of sleeves 126 provides an open cell-like arrangement between the sleeves even where the latter may contact each other between the rods 123 extending from adjacent arms 122.

Of course, the number of sleeves 126 may be either increased or decreased, in which case, the number of rods 123 extending from each arm 122 is correspondingly altered.

The sleeves 126 are removably installed on the corresponding sets of rods 123 by sliding the sleeve axially onto the inwardly curved ends 124 of the rods. Thus, sleeves 126 can be discarded after each use of the oxygenator and replaced by new sleeves on the suitably sterilized supporting framework constituted by rods 123, arms 122, shaft 121 and rings 125.

It will be apparent that, when assembly 120 is rotated in housing 11, as by a drive unit suitably coupled to shaft 121, venous blood showering onto sleeves 126 at the top thereof from manifolds 39 and 39a and/or from manifold 45 (FIG. 4) is dispersed to form filming areas across the pores of each sleeve and also between the sleeves. Further, since the supporting structure for sleeves 126 is open at the ends of the latter, the circulation of oxygen is generally unimpeded so that efficient gas interchange is possible to achieve complete oxygenation of the blood when it drains from the lower portions of sleeves 126.

The particular range of sizes of the pores or cells in the dispersing elements, whether in the form of discs or cylindrical sleeves, is of importance in that each pore must be large enough so that surface tension around a pore having a film of blood extending thereacross will not be great enough to keep most of the mass of fluid from draining away by gravitational force. Further, each pore must not be so large as to prevent the forming of a film of blood thereacross, as it is the presence of such films which makes possible efficient gas interchange. The draining of the blood through the reticulated elements 21 permits the gas atmosphere in chamber 12 to replace the blood displaced from each pore, and the rotation of the elements 21 encourages the circulation of blood and gas therethrough. The fact that the individual pores are too large to retain volumes of blood filling the same contributes to the reduction of the amount of blood required to wet the dispersing elements either during the initiation of the by-pass or during priming of the oxygenator and also reduces the amount of blood retained in the oxygenator when the by-pass is terminated. The amount of blood retained in the oxygenator at the conclusion of the by-pass is further minimized by reason of the fact that the woven plastic material, expanded plastic sheet or void plastic foam used for elements 21 is not essentially wettable, that is, it does not absorb blood in the network defining the open pores or cells.

It has further been found that the non-turbulent, gentle operation of the oxygenator results in minimal trauma to the blood and thereby makes it possible to safely maintain the cardio-pulmonary by-pass for extremely long periods of time.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention, except as defined in the appended claims.

What is claimed is:

1. A blood oxygenator comprising a chamber, at least one dispersing element having a three-dimensional reticulate, open cell structure having between 3 and 20 open cells per linear inch in all directions and being mounted on an open support structure which is rotatable in said chamber, inlet means for venous blood from a patient opening in said chamber adjacent the top of said element for dispersion of the venous blood through said element upon rotation of the latter, means for admitting oxygen into said chamber so as to oxygenate the venous blood dispersed in said element, vent means for releasing carbon dioxide and excess oxygen from within said chamber, and means defining an outlet from the bottom of said chamber for oxygenated blood to be returned to the patient.

2. A blood oxygenator according to claim 1, in which said dispersing element is of an open cellular plastic foam.

3. A blood oxygenator according to claim 2, in which said plastic foam is a void polyurethane foam.

4. A blood oxygenator comprising means defining a chamber, at least one dispersing element having a circular periphery and consisting of a three-dimensional, reticulate open cell structure having between 3 and 20 open cells per linear inch in all directions, means including an open support structure mounting said element for rotation in said chamber about a substantially horizontal axis that is concentric with said circular periphery, means for rotating said element, inlet means for venous blood from a patient opening in said chamber adjacent the top of said periphery of the element for dispersion of the venous blood throughout said reticulate, open structure of the element during rotation of the latter, means for admitting oxygen into said chamber so as to oxygenate the venous blood dispersed in said element, vent means for releasing carbon dioxide and excess oxygen from within said chamber, and means defining an outlet from the bottom of said chamber for oxygenated blood to be returned to the patient.

5. A blood oxygenator as in claim 4; wherein said chamber has a sump depending from the bottom thereof for collecting a volume of oxygenated blood which is small in relation to the volume of said chamber, and said outlet extends from said sump; and further comprising heat exchanging means and filtering and bubble trapping means in said sump to act on the oxygenated blood in advance of discharge of the latter through said outlet.

6. A blood oxygenator as in claim 4; wherein each said dispersing element includes at least one perforate plastic sheet having material between the perforations thereof displaced permanently out of the normal flat plane of said sheet.

7. A blood oxygenator as in claim 6; wherein said sheet is of polypropylene.

8. A blood oxygenator as in claim 6; wherein said dispersing element is in the form of a disc assembled together with additional dispersing discs in axially aligned and spaced relationship.

9. A blood oxygenator as in claim 6; wherein said dispersing element is in the form of a generally cylindrical sleeve assembled together with additional dispersing sleeves in coaxial nested relationship.

10. A blood oxygenator as in claim 4; wherein said chamber is substantially cylindrical and is arranged with its axis extending horizontally concentric with said axis of rotation of said dispersing element.

11. A blood oxygenator as in claim 10; wherein each said dispersing element is in the form of a disc.

12. A blood oxygenator as in claim 10; wherein each said dispersing element is in the form of a generally cylindrical sleeve.

13. A blood oxygenator as in claim 10; wherein said inlet means for venous blood includes a manifold in said chamber extending parallel to said axis of rotation and having orifices opening adjacent the top of each said dispersing element.

14. A blood oxygenator as in claim 10; wherein said means for admitting oxygen into said chamber includes a pair of tubes extending at opposite sides of said dispersing element parallel to said axis of rotation and having oxygen emitting openings directed inwardly and downwardly toward said dispersing element.

15. A blood oxygenator as in claim 10; wherein a vertical cylindrical sump of substantially smaller diameter than said chamber depends centrally from the latter and has said outlet for oxygenated blood located at the bottom of said sump so that the sump defines a relatively small volume reservoir for oxygenated blood extending a substantial distance above said outlet, and a semi-cylindrical shield disposed within the lower half of said chamber and spaced radially inward from the inner surface of said chamber at the sides and bottom of the latter, said shield having its ends spaced axially from the adjacent ends of said chamber so that oxygenated blood dripping from the bottom of each said dispersing element can reach said sump only by flowing axially around said shield.

16. A blood oxygenator as in claim 10; further comprising a vertical cylindrical sump of substantially smaller diameter than said chamber depending centrally from the latter and having said outlet for oxygenated blood located centrally at the bottom of said sump so that said sump defines a relatively small volume reservoir for oxygenated blood extending a substantial distance above said outlet, a cylindrical screen extending upwardly in said sump from the bottom of the latter around said outlet, and a flow directing core mounted on, and closing the upper end of said cylindrical screen so that the oxygenated blood flowing through said sump to said outlet must pass around said core and then through said screen.

17. A blood oxygenator as in claim 16; further comprising a circular, spaced array of heat transfer tubes extending axially in said sump between the latter and said screen and core so that the blood flowing through said sump contacts said tubes, and means for circulating a heat exchange fluid through said tubes.

References Cited

UNITED STATES PATENTS

| | | | |
|---|---|---|---|
| 2,833,279 | 5/1958 | Gollan | 23—258.5 |
| 3,026,871 | 3/1962 | Thomas | 23—258.5 |
| 3,070,092 | 12/1962 | Wild et al. | 23—258.5 |
| 3,183,908 | 5/1965 | Collins et al. | 23—258.5 |
| 3,211,148 | 10/1965 | Galajda | 23—258.5 |
| 3,256,883 | 6/1966 | De Wall | 23—258.5 |
| 3,191,600 | 5/1965 | Everett | 128—276 |

FOREIGN PATENTS

| | | |
|---|---|---|
| 1,125,675 | 11/1956 | France. |
| 1,455,775 | 9/1966 | France. |

OTHER REFERENCES

"A Magnetic Blood Oxygenator," E. W. H. Cruickshank, J. Physiology, 82: No. 1: pp. 26–32 (August 1934).

MORRIS O. WOLK, Primary Examiner

D. G. CONLIN, Assistant Examiner

U.S. Cl. X.R.

128—400